(12) United States Patent
Hoover

(10) Patent No.: US 6,753,977 B2
(45) Date of Patent: Jun. 22, 2004

(54) MACHINE-READABLE INFORMATION EMBEDDED ON A DOCUMENT

(75) Inventor: Rick Paul Hoover, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 509 days.

(21) Appl. No.: 09/773,405

(22) Filed: Jan. 31, 2001

(65) Prior Publication Data

US 2002/0101597 A1 Aug. 1, 2002

(51) Int. Cl.$^7$ .............................................. B41B 1/419
(52) U.S. Cl. ........................ 358/1.9; 382/100; 382/232
(58) Field of Search ................................. 382/234, 235, 382/242, 248, 250, 112, 100, 135, 137, 139, 140, 232, 233; 347/15, 14, 18, 120, 129, 134; 705/56, 54, 57, 58, 62, 72; 358/450, 540, 1.9

(56) References Cited

U.S. PATENT DOCUMENTS

| | | | | |
|---|---|---|---|---|
| 5,765,176 A | * | 6/1998 | Bloomberg | ................. 715/514 |
| 5,940,585 A | * | 8/1999 | Vondran et al. | ............ 358/1.15 |
| 5,974,548 A | * | 10/1999 | Adams | ........................ 713/200 |
| 6,311,214 B1 | * | 10/2001 | Rhoads | ........................ 709/217 |
| 6,351,815 B1 | * | 2/2002 | Adams | ........................ 713/200 |
| 6,582,138 B1 | * | 6/2003 | Meunier et al. | ............ 400/103 |

* cited by examiner

Primary Examiner—Bhavesh M. Mehta
Assistant Examiner—Seyed Azarian
(74) Attorney, Agent, or Firm—Leslie G. Murray

(57) ABSTRACT

Machine-readable information provided on a printed document in the form of printed marks which are not visually perceptible to the human eye. The printed marks are of a combination of sufficiently small size and selected color which renders the printed marks visually imperceptible to the human eye, yet easily detectable by a machine such as a scanner. The printed marks are dispersed across portions of or all of the printed document in selected patterns for encoding information, such as in a bar code, or the information may merely be printed text. The marks representing the information are printed in unused blank space between or surrounding existing text and other images on the printed document thus avoiding the use of any additional surface area of the media.

20 Claims, 8 Drawing Sheets

MACHINE-READABLE INFORMATION EMBEDDED ON A DOCUMENT

CROSS-REFERENCE TO RELATED APPLICATION

In copending U.S. application Ser. No. 09/373,458, filed on Aug. 12, 1999, entitled, "Encoding Information Within Text Printed on a Page Using Differing Gray or Color Levels," assigned to the assignee of the present invention and hereby incorporated by reference, there is described a method of encoding information in the primary image on a printed page.

FIELD OF THE INVENTION

The present invention relates generally to image processing and information encoding and, more particularly, to printing or encoding information on printed pages together with printed images or text using combinations of the printed mark size and marking material color which are imperceptible to the human eye.

BACKGROUND OF THE INVENTION

Steganography is the art and science of communicating in a way which hides the existence of the communication. In contrast to cryptography which actually encrypts or encodes a message to hide its meaning, the goal of Steganography is to hide a second message within a first, otherwise harmless message.

The word Steganography literally means covered writing as derived from Greek. It includes a vast array of methods and variations that have been used throughout history to conceal information and the very existence of a message. For example, drawings have often been used to conceal or reveal information. It is simple to encode a message by varying lines, colors or other elements in pictures. With the advent of the computer, the electronic printer and the ability to process and manipulate images and data, such methods have been taken to new dimensions.

Plain paper has long been a favored recording medium for storing and transferring human readable information. In fact, it has recently been said that paper is one of the most promising media types for new computer applications. Even given the emergence of digital-based electronic communications, such as the world wide web, paper-based communication has kept pace with digital information. Electronic document processing systems have enhanced the functional utility of plain paper and other types of hardcopy documents by enabling the application of machine readable digital data thereon. This machine readable data enables the hardcopy document to actively interact with such a document processing system in a variety of different ways when the document is scanned into the system by an ordinary input scanner. See, for example, the copending U.S. patent application Ser. No. 09/369,381 of Paul Jeran and Terry Mahoney, Ser. No. 09/369,381, filed on Aug. 5, 1999, assigned to the instant assignee, and entitled "Methods of Document Management and Automated Document Tracking, and a Document Management System." Jeran et al discloses a document management system wherein a printing device is configured to print text on a document as well as to automatically print machine-readable code on the document. The document management system also includes a scanning device configured to scan documents and extract at least some information from the machine-readable code, the information thus extracted being used to manage or control the use, distribution or the like of the document.

As a general rule, digital data is recorded by writing two-dimensional marks on a recording medium using a marking material in accordance with a pattern which encodes the data either by the presence or absence of marks at a sequence of spatial locations or by the presence or absence of mark-related transitions at such locations. When the recording medium is paper, the writing is accomplished by a printing device resulting in printed text or other images on the surface of the paper which visually communicates the information to the user.

The marking of printed documents or other articles with information, such as the use of bar codes, for identification and sorting is well known. The conventional black on white bar code is useful only on areas of white or other light colored background on articles. It is further known to use fluorescent inks and other marking materials to provide bar codes or other intelligible markings on documents and the like that are virtually invisible to the unaided eye.

While the use of bar codes and other prior art methods are effective in providing machine-readable information, the presence, if not the meaning, of the information is typically discernable to the user and it requires the use of at least some surface area which could otherwise be used for text or other images. It would therefore be desirable to develop methods of providing machine-readable information which is not visually perceptible to the human eye and does not require the use of additional media surface area.

SUMMARY OF THE INVENTION

In a preferred embodiment, the present invention provides machine-readable information on a printed document in the form of printed marks which are not visually perceptible to the human eye. A combination of sufficiently small size and selected color render the printed marks visually imperceptible to the human eye, yet easily detectable by a machine such as a scanner. The printed marks are dispersed across portions or all of the printed document in selected patterns for encoding the information, such as in a bar code, or the information may merely be printed text. The marks representing the information are printed in unused blank space between or surrounding existing text and other images on the printed document thus avoiding the use of any additional surface area of the media.

The present invention may be implemented as a method of providing information on a printed page wherein a set of image elements are printed on a printed page in a selected pattern representing information to be printed on a printed page. The image elements are dispersed over at least a portion of the printed page. Each of the printed image elements is of a sufficiently small size and color to be visually imperceptible to the human eye.

In a preferred embodiment, the present invention is implemented as a method of encoding information on a page of printed text wherein a combination of size and color is selected to provide printed marks which are visually imperceptible to the human eye. A first set of data representing a printed page of text or other images is provided. The method includes identifying allowable encoding locations on the page of printed text, preferably the allowable locations will be at positions of blank space between or surrounding existing characters. A second set of data representing image elements mapped to allowable encoding locations in a selected pattern corresponding to information to be encoded on the page of printed text is generated. The first and second sets of data are then summed or otherwise combined, preferably using an AND or OR operation, to generate a third set of data representing the page of printed text modified to include the encoded information. The third set of data is then utilized to print the modified page of printed text.

Other aspects and advantages of the present invention will become apparent from the following detailed description, taken in conjunction with the accompanying drawings, illustrating by way of example the principles of the invention.

BRIEF DESCRIPTION OF THE DRAWINGS

The present invention will be described with reference to the accompanying drawings in which like reference numbers indicate identical or functionally similar elements.

DETAILED DESCRIPTION OF THE INVENTION

Figure 1:
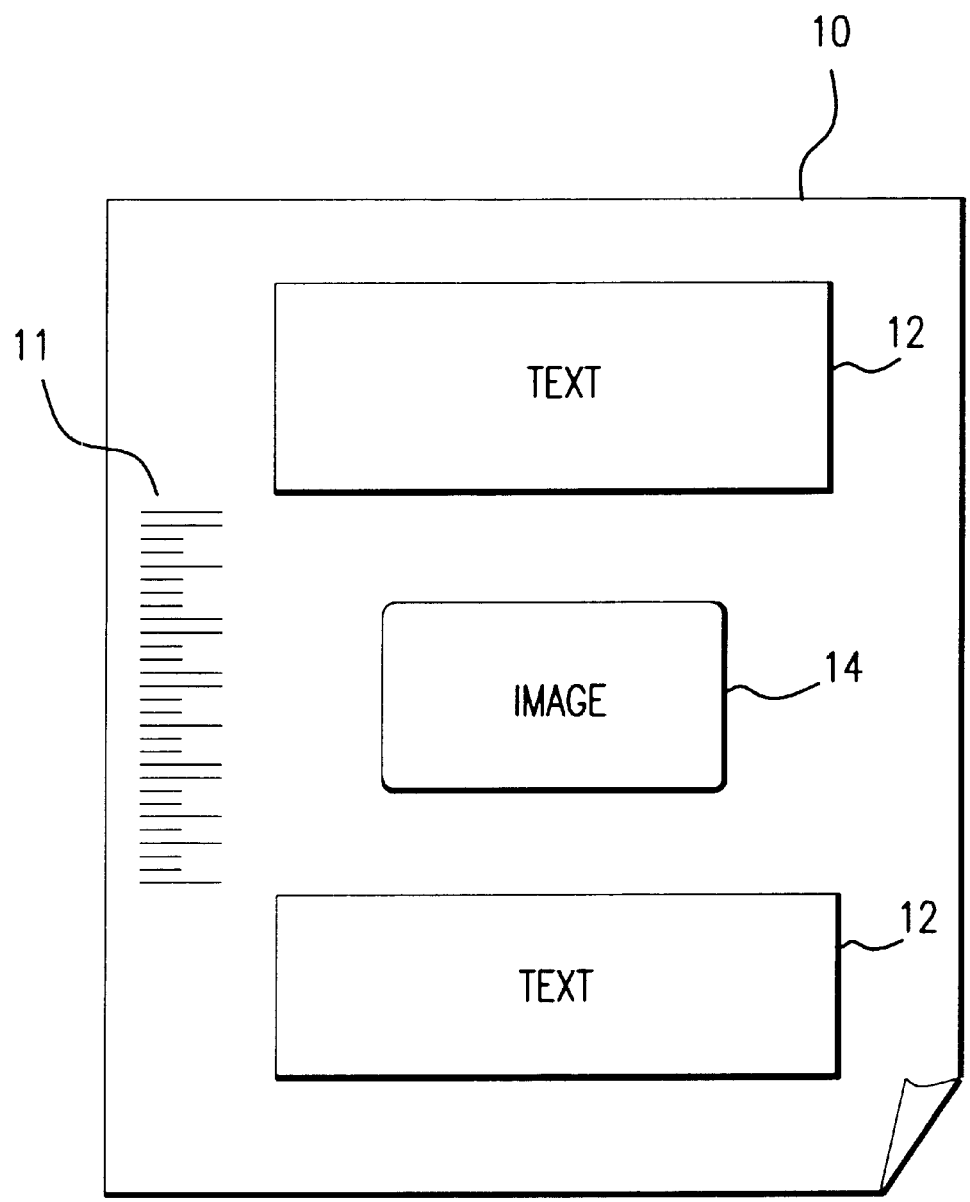
FIG. 1 illustrates a prior art method of providing a bar code on a printed document.

As shown in the drawings for purposes of illustration, the present invention is embodied in a document processing system and method which encodes information on a page of printed text wherein a combination of size and color is selected to provide printed marks which are visually imperceptible to the human eye to encode information within the displayed text. Since the printed marks are so slight as to be imperceptible to the human eye, the presence of the encoded information is hidden from the human reader, yet is easily detectable by a machine such as a digital scanner. While various techniques to provide machine readable information on a printed page are known, typically such techniques require the addition of printed material to the page. In a preferred method of the present invention, information is encoded in existing, unused space around the edges of and printed images on a page, thus avoiding the use of any additional surface area on the media page.

Figure 2A:
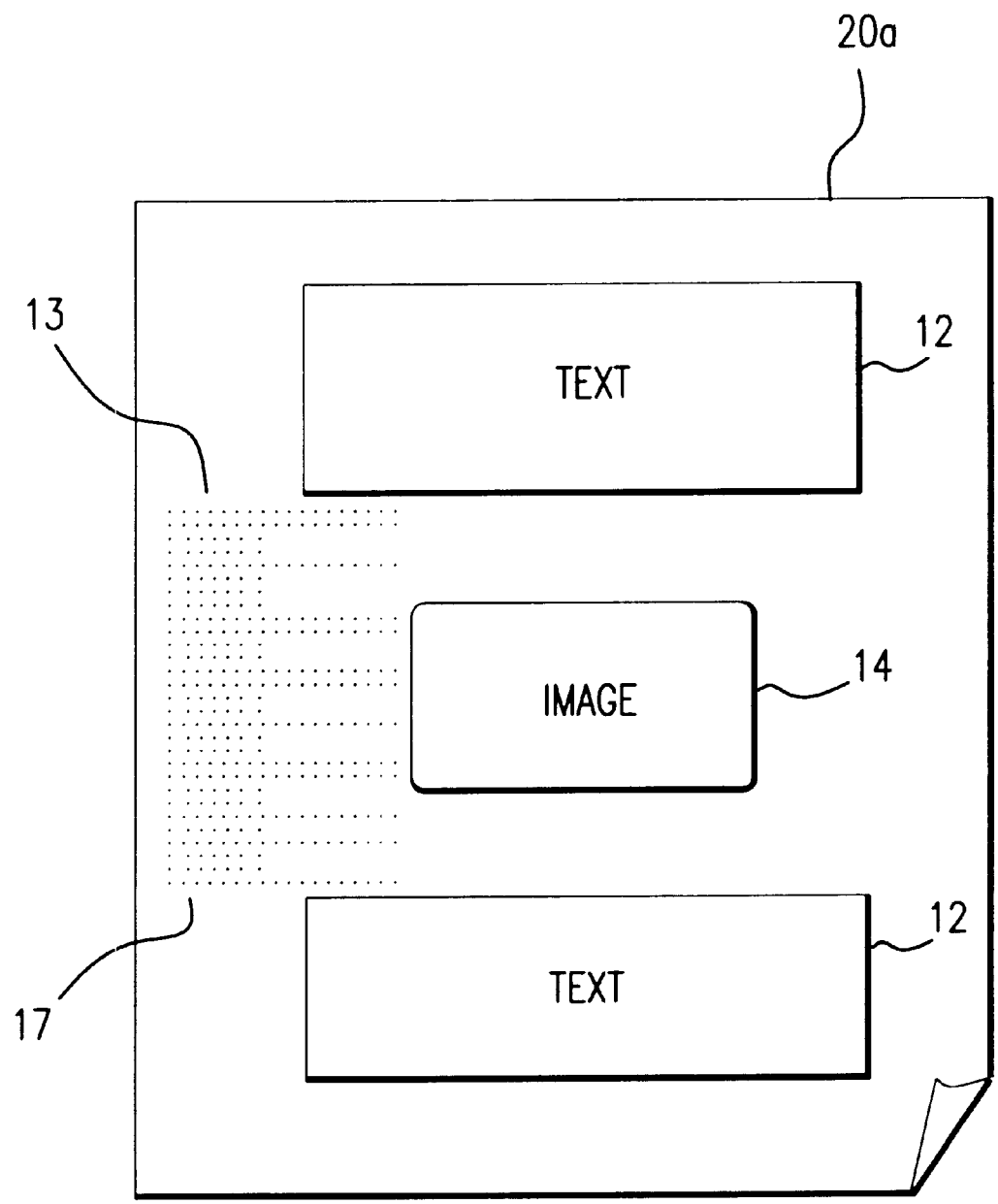
FIGS. 2A and 2B illustrate a bar code provided on a printed document according to the principles of the present invention.
Figure 2B:
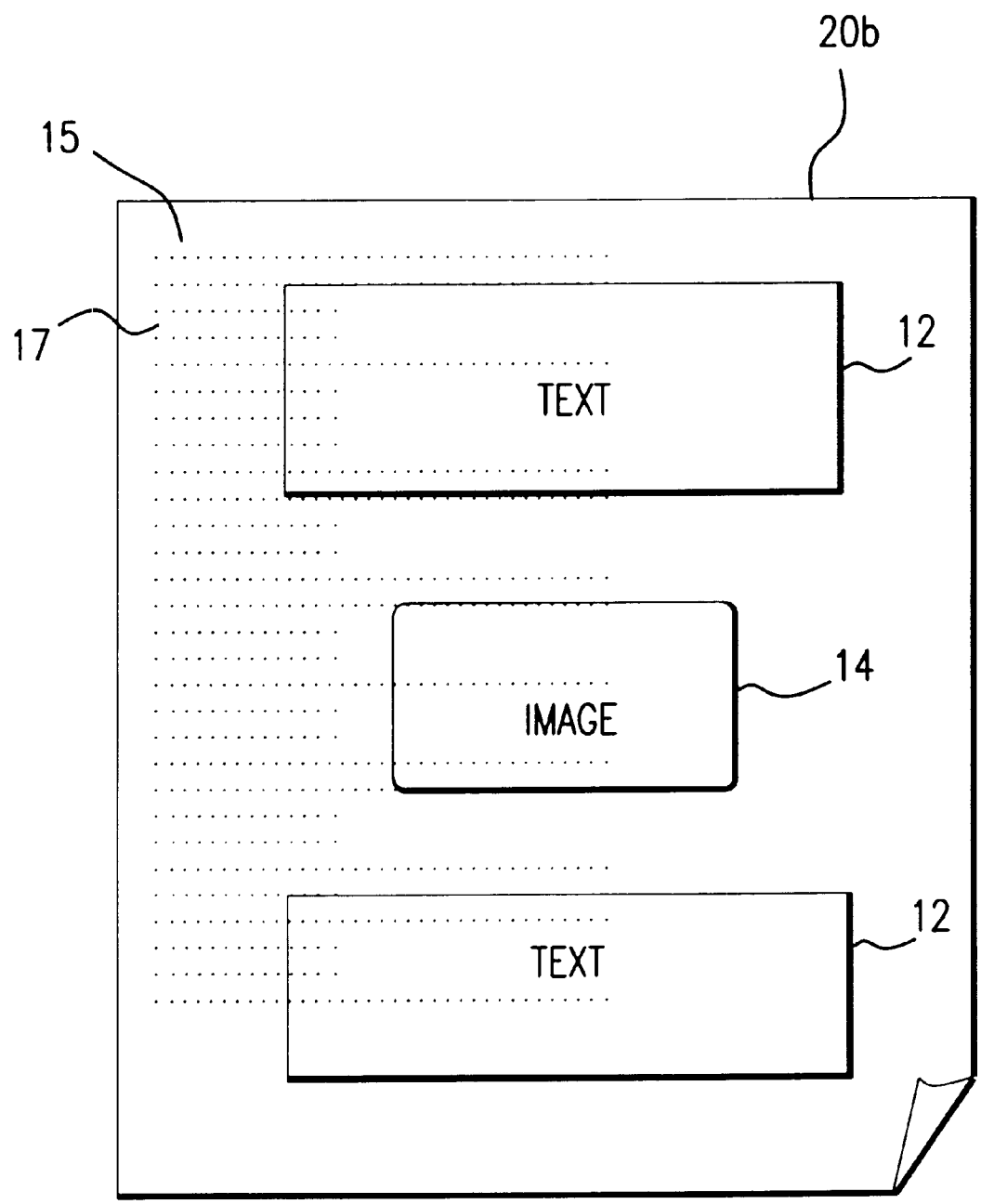

Referring now to FIGS. 1, 2A and 2B, a printed document page 10 having text 12 and/or other images 14 and including information encoded in a bar code 11 printed along a left edge of the page 10 according to the prior art is shown, When the document is prepared, each page must be formatted to leave sufficient space to allow printing any identifying or other information, such as bar code 11, on the page 10 FIGS. 2A and 2B illustrate printed pages 20a and 20b including printed bar codes 13 and 15, respectively, which are visually representations of the bar code it, shown in FIG. 1, printed according to the principles of the present invention. It is understood that the size of the dots 17 representing bar codes 13, 15 has been greatly exaggerated for the purposes of illustration. The bar codes 13, 15 are made up of small, individual printed marks or dots 17 dispersed in an appropriate pattern, a pattern corresponding to bar code 11 in this example, across portions or all of the pages 20a, 20b, printed in blank or unused space around and between the text 12 and any other images 14 printed on the page. The printed marks 17 are sufficiently small and sufficiently separated so as to make them imperceptible to the human eye, yet readable by a machine, such as a scanner, for example. Additionally, the printed marks 17 may be printed in a selected color, such as yellow, for example, to increase the imperceptibility of the individual printed marks 17.

Figure 3:
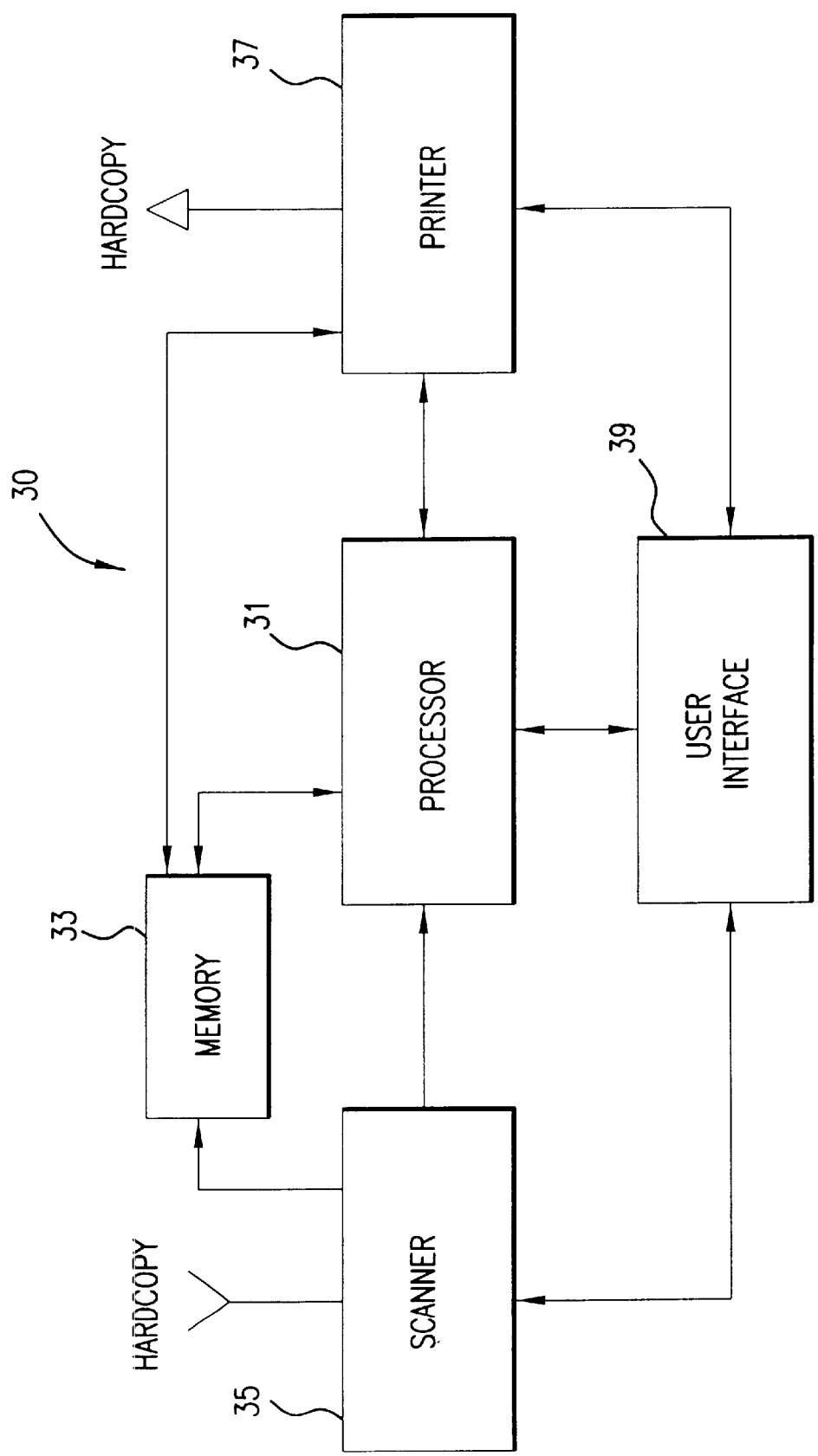
FIG. 3 is a simplified block diagram of a system for performing the method of the invention.

Referring now to FIG. 3, a basic document processing system 30 which may suitable for practicing the present invention is illustrated. The system 30 includes a digital processor 31 having a memory 33, an input device illustratively shown as a scanner 35 for inputting digital representations of previously printed hardcopy documents to the processor 31, and an output device illustratively shown as a printer 37 for providing hardcopy renderings of modified previously printed documents according to a preferred embodiment of the invention. The system 30 also includes a user interface 39, such as a personal computer, including a keyboard or other user input device, enabling a user to interact with the processor 31, the input scanner 35, and the printer 37. In practice, the system 30 could be configured to have a distributed architecture with text 12 and image 14 input data from a hardcopy document, for example, being provided by a remote scanner or facsimile machine. Similarly, the processor 31, the memory 33 and the user interface 39 could be implemented in a document server, for example. Alternatively, text 12 and image 14 data representing a page or document could be provided from other sources, such as a word processor (via a printer driver, for example) or a facsimile machine prior to the document being printed thus eliminating the need to scan the document. Similarly, rather than being output to printer 37, the modified document could be output to a visual display, such as a personal computer monitor, for example, facsimile machine or other electronic transmission means, such as an e-mail system, for example, for transmission to one or more remote locations where the modified document could then be displayed or printed, or, alternatively, decoded without first being displayed.

Figure 4:
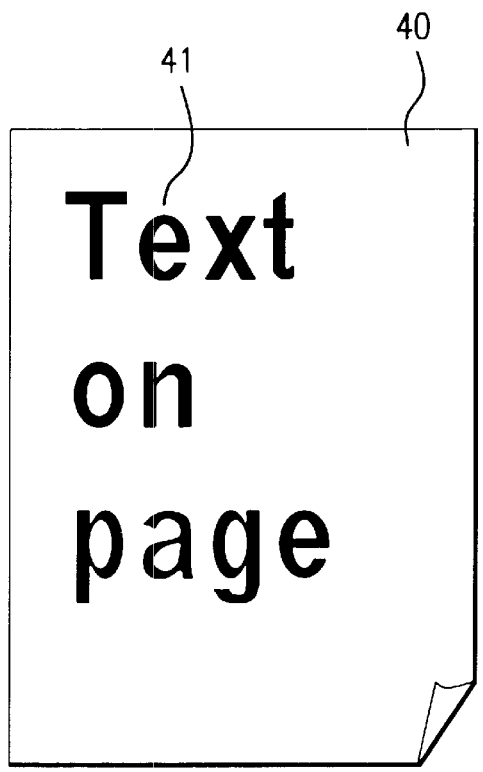
FIG. 4 illustrates an original page of printed text.

Referring now also to FIG. 4, in a preferred method of the invention, the scanner 35 scans a selected hardcopy input document 40 providing a set of data representing text 41 or other images printed on the hardcopy document 40 to the processor 31. The scanner 35 output may also be stored in memory 33. The output of the scanner 35 is a digital signal corresponding to the different printed pixels making up the text 41 and other images printed on the hardcopy document 40. Alternatively, as is known in the art, the scanner 35 may provide an analog output which is then converted to digital values using an A/D convertor and other circuitry (not shown). Preferably, the output of the scanner 35 is raster data representing the input hardcopy document 40.

Figure 5:
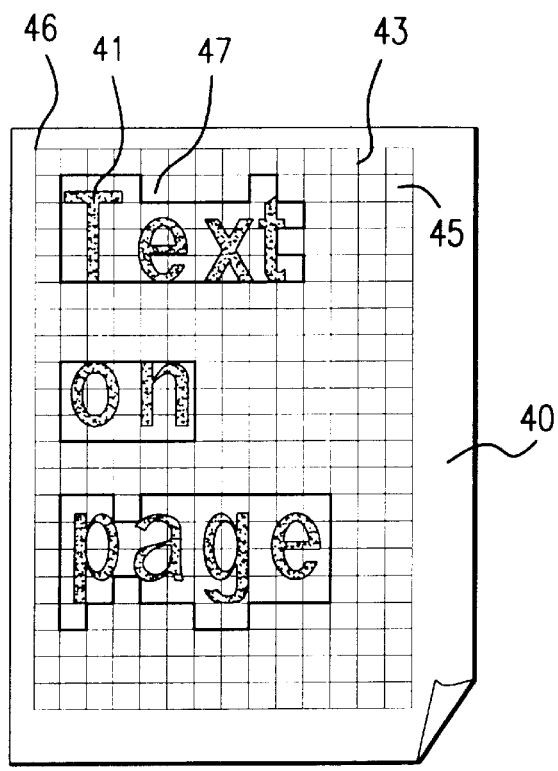
FIG. 5 illustrates the page of FIG. 4 overlaid with an encoding grid.
Figure 6:
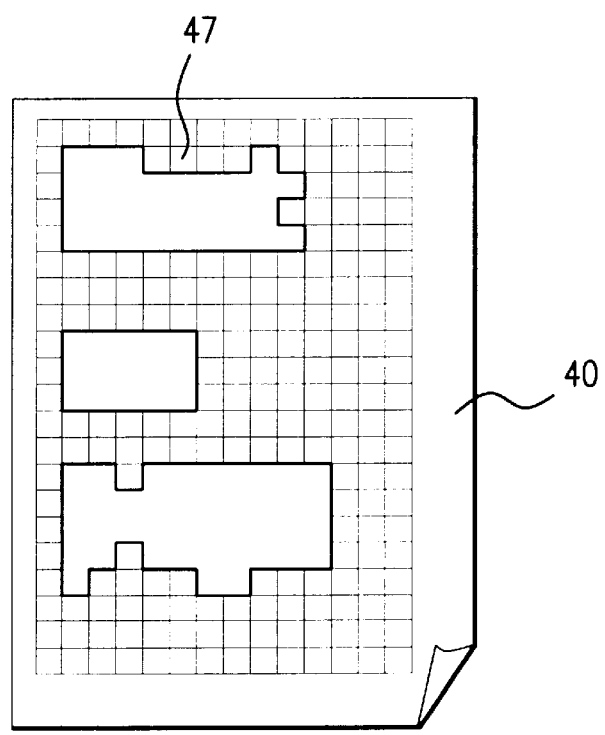
FIG. 6 illustrates the page of FIG. 4 showing the allowable encoding locations on the page.

Referring now also to FIGS. 5 and 6, in accordance with the invention, encoding of information is accomplished only at allowable encoding sites or locations. Allowable encoding locations are defined according to a set of predetermined rules; for example, encoding is allowed only in the blank spaces around or separating individual characters of printed text. The processor 31 overlays the page 40 with an electronic or virtual grid 43 composed of cells 45. Each cell 45 may contain one or more pixels. The grid 43 is oriented with respect to a reference point 46 on the page to provide spatial identification of the allowable encoding locations. The grid 43 may be uniform, such as is shown in FIG. 5, or, alternatively, may be non-uniform. For example, the grid 43 may define one cell 45 for each dot or printed mark 17. Allowable encoding locations 47 are then identified where areas of blank space intersect with the grid 43 according to the predetermined rules. For example, in order to qualify as an encoding location, each cell must have a sufficient number of pixels representing one or more blank spaces within the cell.

Figure 7:
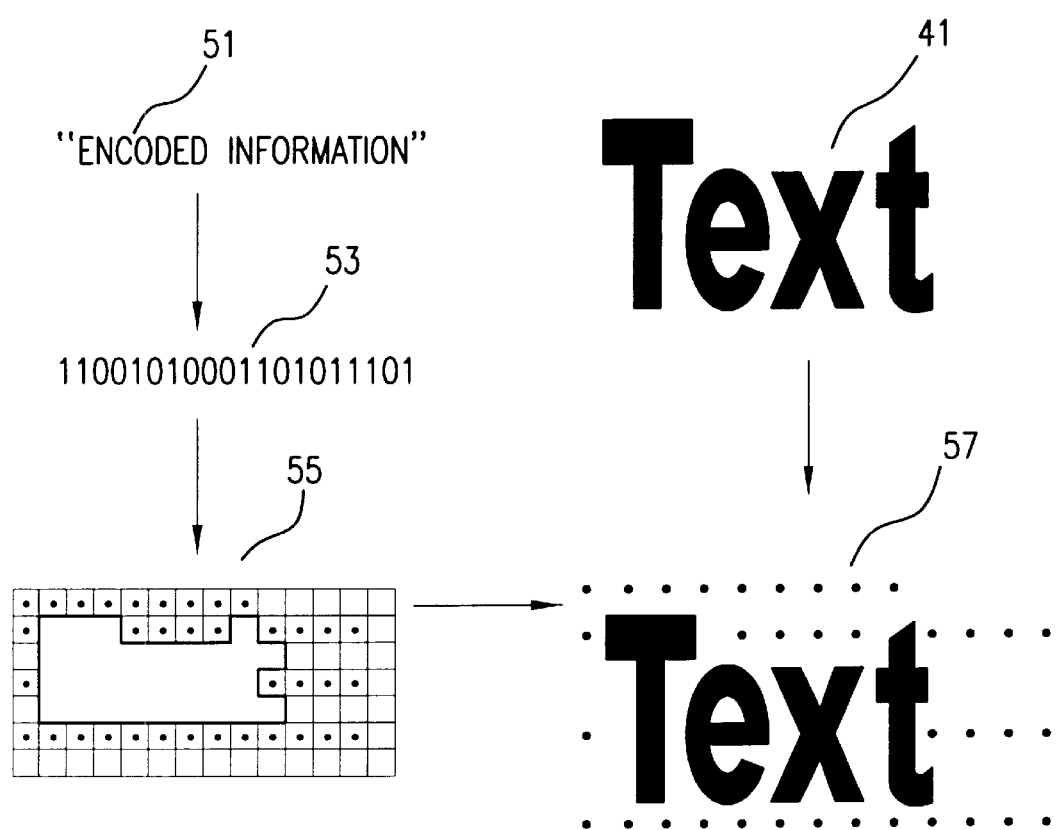
FIG. 7 is a simplified schematic diagram illustrating a preferred encoding method according to the principles of the present invention.

Referring now also to FIG. 7, selected information 51, bar code 11 in this example, to be encoded is input by a user via user interface 39. The processor 31 converts the information 51 to a digital signal 53. The digital signal 53 is then converted to a compatible format utilizing one or more color values and combined with or mapped to the grid 43 to spatially distribute the encoded data 53 to the desired allowable encoding locations 47 according to a predetermined set of encoding rules to generate a set of digital data representing the encoded data (represented graphically at reference numeral 55 of FIG. 7). The data signal representing the encoded information 55 is then combined, using an AND or OR operation, for example, with the data signal representing the text 41 to generate a digital data signal (represented graphically at reference numeral 57 of FIG. 5) representing a modified document page including the original printed text 41 and the encoded information 51. The digital signal representing the modified document page 57 is used to control the printer 37 for printing hardcopy renderings of the modified document page 57.

Figure 8:
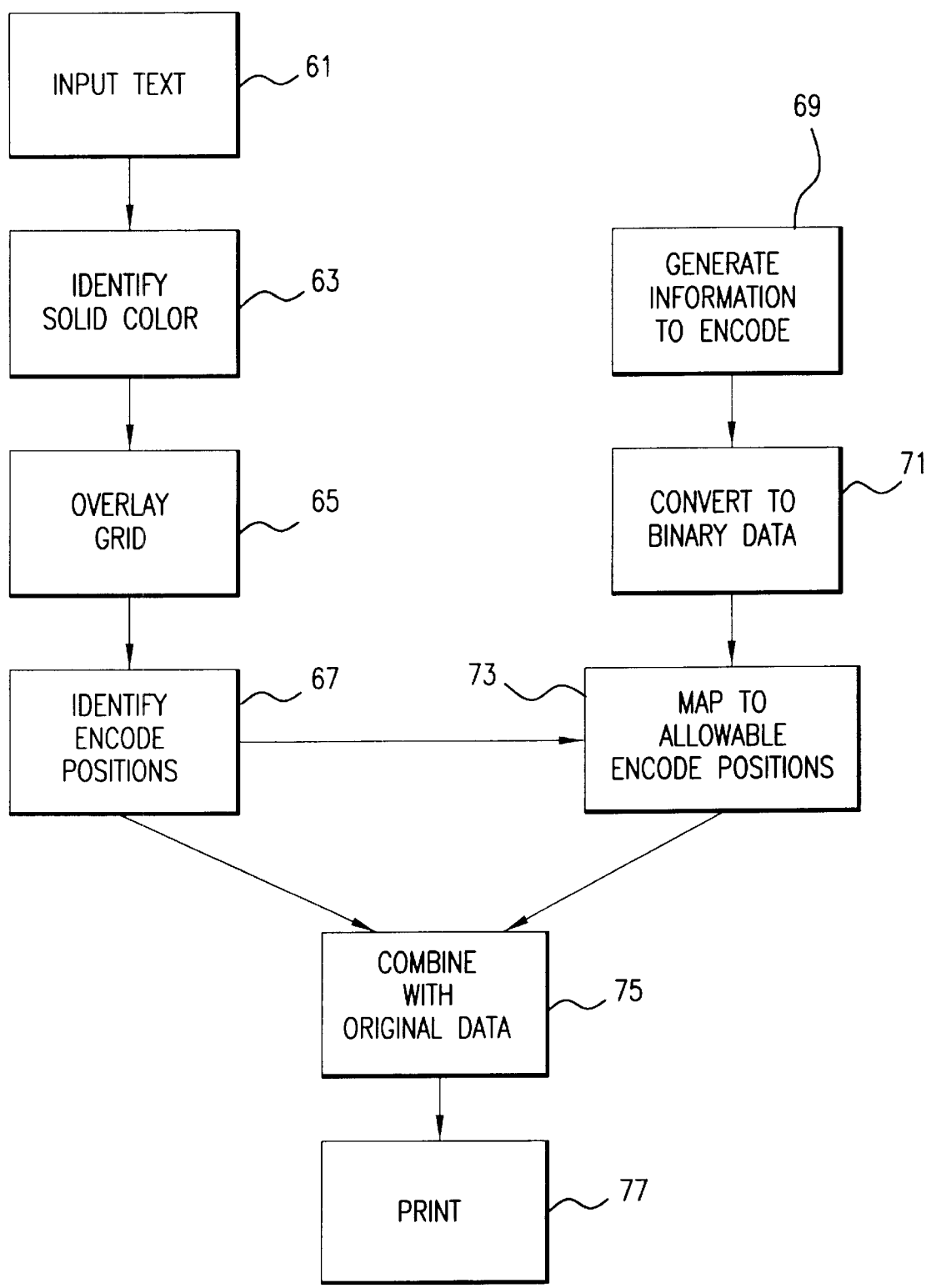
FIG. 8 is a simplified flow chart illustrating a preferred encoding method according to the principles of the present invention.

Referring now also to FIG. 8, a simplified flow chart of a preferred method of the invention for writing (i.e., encoding) desired information within previously printed text is illustrated. The first step 61 is to provide the processor with the original printed text in which the information will be encoded. The text can be input from previously printed hardcopy via a scanner 35 (as shown in FIG. 3). Alternatively, blocks of properly formatted data representing pages of text or other images can be provided from memory 33 (as shown in FIG. 1), or in real time directly from an application, such as a word processor, or input from a facsimile machine, for example. Preferably, the input text is provided in binary form as raster data. Within the raster data, areas of solid color such as text or line art, for example, are identified, step 63. The page is then overlaid with a virtual grid 43 referenced to a point 46 (as shown in FIG. 5) on the page, step 65. The reference point 46 could be along the edge or at a corner of the page, or could be at the beginning of the raster data, for example. The grid is preferably Cartesian, but, alternatively, could be Polar coordinates, for example, or other suitable coordinate system. According to a predetermined set of rules, positions where the grid and empty or blank space intersect are identified as allowable encoding locations, step 67.

At step 69, the information desired to be encoded is generated. Preferably, the information to be encoded is input by a user via the user interface 39 (as shown in FIG. 3). The user input could be real time with the processor 31 querying or prompting the user at the appropriate time as the process proceeds. Alternatively, the entire process could be under program control executed by the processor 31 wherein the information to be encoded is stored in memory 33 or other storage device, such as a video compact disc, for example, with the processor 31 retrieving the information automatically at the proper time as the process proceeds. The information is then converted to a binary format, step 71. According to a set of encoding rules, the binary data representing the information to be encoded is mapped, step 73, to the allowable encoding positions as determined in step 67.

Finally, the data representing the information to be encoded is mapped to the allowable encoding locations is combined with the data representing the original text, step 75, preferably using an AND or OR operation to generate data representing a modified document including the original text or image and the encoded information as described herein above. The data representing the modified document generated at step 75 is now utilized to drive a printer 37 (as shown in FIG. 3) and print a hardcopy document, step 77. Alternatively, the modified document data may be output to a display, facsimile machine or other electronic transmission means, such as an e-mail system, (not shown) for transmission to a remote user. The modified printed hardcopy document displays the original text and the encoded information. Since the individual printed marks representing the encoded information are of a small size and light color, and are dispersed across the page or across portions of the page, a human user cannot discern any difference between the modified document and the original document, yet the encoded information is easily detected by a machine such as a scanner, for example.

Figure 9:
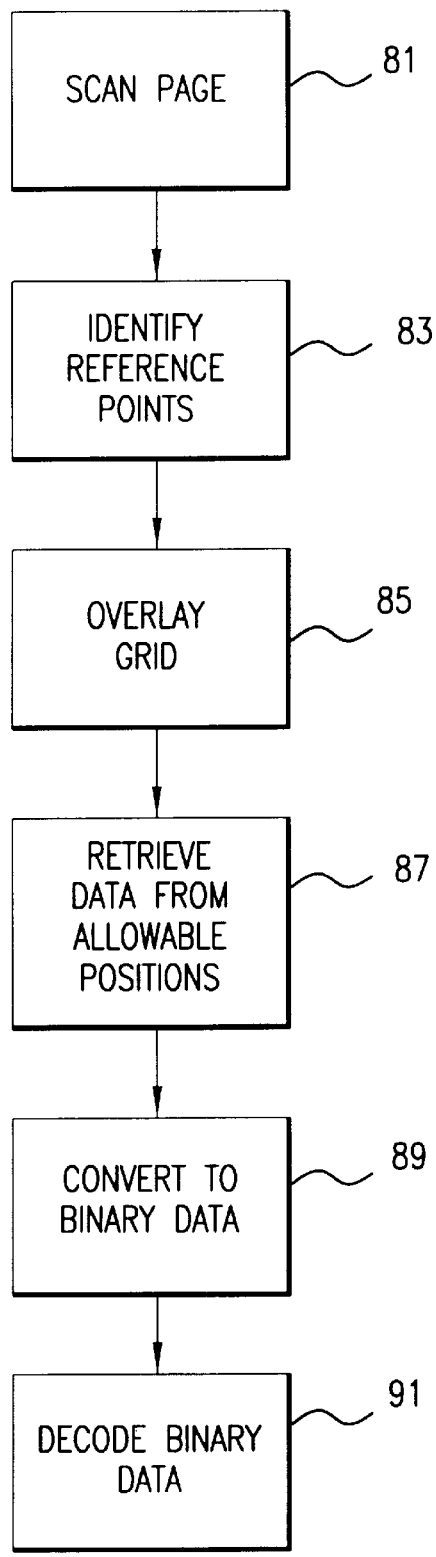
FIG. 9 is a simplified flow chart illustrating a preferred method of decoding information encoded according to the principles of the present invention.

Referring now also to FIG. 9, a simplified flow chart of a preferred method for reading (i.e., decoding) information encoded within previously printed document according to the present invention is illustrated. A hardcopy document having text and/or other images with embedded encoded information is scanned, step 81, in a scanner 35 (as shown in FIG. 3) for providing input encoded data to the processor 31. As discussed above, the scanned input data is raster data in digital form. The reference point 46 (as shown in FIG. 5) for the page used during encoding is identified, step 83. Knowledge of the reference point is necessary to properly position and overlay the grid on the page, step 85. In a preferred embodiment, the reference point 46 is standard and is known to the processor 31 program used for encoding and decoding information. Alternatively, the reference point 46 may be marked (i.e., encoded) during the information encoding process in such a manner that it is identifiable by the scanner 35 or the processor 31 without further decoding of the encoded user message. Similarly, as described above, each grid position can correspond one-to-one for each raster (pixel) position or each grid position may encompass a plurality of pixel or raster positions which form a cell.

When the grid is properly overlaid on the page, for grid positions at which a printed mark is identified, the data is retrieved, step 87. The data is then then converted to binary (or multi-bit) data according to predetermined decoding rules corresponding to the encoding rules used during the encoding process, step 89. The binary data is then decoded to provide the original information which was encoded as described above, step 91.

While having described and illustrated the principles of the present invention with reference to various preferred embodiments and alternatives, it will be apparent to those familiar with the art that the invention can be further modified in arrangement and detail without departing from those principles. Accordingly, it is understood that the present invention includes all such modifications that come within the terms of the following claims and equivalents thereof.

What is claimed is:

1. A method of encoding information on a page of printed text, the method comprising:

providing a first set of data representing a page of text;

identifying allowable encoding locations on the page of text, the allowable encoding locations including unused blank spaces proximate the text;

generating a second set of data representing image elements arranged in a selected pattern corresponding to information to be encoded;

printing the image elements on the page of text, the printed image elements dispersed over selected areas of the page at the allowable encoding locations wherein each printed image element is separated from other printed image elements, each printed image element being of a selected size and color which is imperceptible to the human eye.

2. The method of claim 1 further including the steps of:

combining the first and second sets of data to generate a third set of data representing the page of text modified to include the encoded information; and utilizing the third set of data to print the modified page of text, the modifications to the page of text being imperceptible to the human eye.

3. The method of claim 2 further including the step of displaying the modified page of text.

4. The method of claim 1 wherein the allowable encoding locations include unused blank spaces between and separating the text.

5. The method of claim 1 wherein identifying allowable encoding locations comprises:

overlaying the page of text with a grid referenced to a predefined point on the page of text;

identifying the allowable encoding locations according to a predefined criteria; and mapping the allowable encoding locations to the grid.

6. The method of claim 5 wherein the grid comprises a uniform grid.

7. The method of claim 5 wherein the grid comprises a non-uniform grid.

8. The method of claim 5 wherein each of the allowable encoding locations corresponds to a single pixel.

9. The method of claim 5 wherein each of the allowable encoding locations corresponds to a plurality of pixels associated according to a predefined rule.

10. The method of claim 5 wherein each of the allowable encoding locations corresponds to one or more pixels representing the unused blank spaces on the page of text.

11. The method of claim 5 wherein each of the allowable encoding locations corresponds to one or more pixels representing the unused blank spaces between and separating text characters.

12. Apparatus for encoding information on a printed page, comprising:

first input means for providing a first set of digital data representative of printed images on an original page to be modified;

processor means coupled to the input means for identifying allowable encoding locations on the original page, the allowable encoding locations including unused blank spaces between and separating the primed images;

second input means coupled to the processor means for providing a second set of data representing selected information to be encoded on the original page, the processor means combining the first and second sets of data to generate a third set of data representative of the original page modified to include the printed images on the original page and the selected information encoded thereon, when the modified page is printed, the modification to the original page being imperceptible to the human eye.

13. Apparatus as in claim 12 further comprising printer means coupled to the processor means and being controlled by the third set of data to print the modified page, the difference between the modified page and the original page being imperceptible to the human eye.

14. Apparatus as in claim 13 wherein the printer means comprises a color printer.

15. Apparatus as in claim 13 wherein the printer means comprises a printer having a resolution of at least 600 dots per inch.

16. Apparatus as in claim 12 wherein the first input means comprises a seamier for reading printed pages of a document and providing digital data representative of images printed on the document pages.

17. Apparatus as in claim 12 further including memory means coupled to the first and second input means, and to the processor means, the memory means for storing the digital data representative of the printed images on the original page and of the selected information to be encoded.

18. Apparatus as in claim 12 wherein the processor means is operating under computer program control.

19. Apparatus as in claim 12 wherein the second input means comprises a personal computer coupled to the processor means and the first input means, the personal computer including a keyboard enabling a user to provide the selected information for encoding.

20. An article of manufacture comprising a program storage medium having computer readable program code means embodied therein for adapting a computer to encode selected information on a printed page, the computer readable program code means in the article of manufacture including:

computer readable program code means for enabling a computer to identify allowable encoding locations on a page, the allowable encoding locations including unused blank spaces proximate images on the printed page;

computer readable program code means for enabling a computer to generate a first set of data representing printed images on an original document;

computer readable program code means for enabling a computer to generate a second set of data representing selected information to be encoded on the original document; and computer readable program code means for enabling a computer to combine the first and second sets of data to generate a third set of data representing the original document modified to include the selected information encoded therein, when the modified original document is printed, the modifications to the original document being imperceptible to the human eye.

* * * * *

UNITED STATES PATENT AND TRADEMARK OFFICE
CERTIFICATE OF CORRECTION

PATENT NO.   : 6,753,977 B2
DATED        : June 22, 2004
INVENTOR(S)  : Rick Paul Hoover It is certified that error appears in the above-identified patent and that said Letters Patent is hereby corrected as shown below:

Column 3,
Line 61, delete "shown," and insert therefor -- shown. --

Column 4,
Line 17, after "may" insert -- be --

Column 7,
Line 63, delete "primed" and insert therefor -- printed --

Column 8,
Line 22, delete "seamier" and insert therefor -- scanner --

Signed and Sealed this

Eleventh Day of January, 2005

JON W. DUDAS
*Director of the United States Patent and Trademark Office*